United States Patent
Baumgarten et al.

(10) Patent No.: US 10,362,732 B2
(45) Date of Patent: Jul. 30, 2019

(54) COMBINE HARVESTER HAVING A DRIVER ASSISTANCE SYSTEM

(71) Applicant: CLAAS Selbstfahrende Erntemaschinen GmbH, Harsewinkel (DE)

(72) Inventors: Joachim Baumgarten, Beelen (DE); Andreas Wilken, Bissendorf (DE); Christoph Heitmann, Warendorf (DE); Jörn Brinkmann, Harsewinkel (DE); Christopher Vieregge, Dörentrup (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 184 days.

(21) Appl. No.: 15/695,482

(22) Filed: Sep. 5, 2017

(65) Prior Publication Data

US 2018/0084718 A1 Mar. 29, 2018

(30) Foreign Application Priority Data

Sep. 27, 2016 (DE) .................. 10 2016 118 187

(51) Int. Cl.
*A01D 41/12* (2006.01)
*A01D 41/127* (2006.01)
(Continued)

(52) U.S. Cl.
CPC ....... *A01D 41/1243* (2013.01); *A01D 41/127* (2013.01); *A01D 41/1271* (2013.01);
(Continued)

(58) Field of Classification Search
CPC .............. A01D 41/1243; A01D 41/127; A01D 41/1271; A01D 41/04; A01D 41/10; A01D 41/1276; A01F 12/40
See application file for complete search history.

(56) References Cited

U.S. PATENT DOCUMENTS

| 5,569,081 A | 10/1996 | Baumgarten et al. |
| 2003/0066277 A1 | 4/2003 | Behnke |

(Continued)

FOREIGN PATENT DOCUMENTS

| DE | 10 2014 113 965 A1 | 3/2016 |
| EP | 0 685 151 A1 | 12/1995 |

(Continued)

OTHER PUBLICATIONS

European Search Report for European Patent Application No. 17168174.5 dated Dec. 11, 2017, 7 pages.

*Primary Examiner* — Russell Frejd
(74) *Attorney, Agent, or Firm* — Lempia Summerfield Katz LLC

(57) ABSTRACT

A combine harvester which regulates spreading of crop flow on the ground, with the crop flow passing through a shredding and/or a spreading device in the rear region of the combine harvester, is disclosed. The combine harvester includes a driver assistance system, which includes a computing unit and a display unit. The computing unit processes information generated by the machine's internal sensor systems, external information and information storable in the computing unit. The driver assistance system stores selectable spreading strategies to regulate the spreading of the crop flow exiting the combine harvester and one or more of the partial strategies assigned to the respective spreading strategy. The driver assistance system uses the selectable spreading strategies and the partial strategies in order to regulate the crop flow spread on the ground.

21 Claims, 6 Drawing Sheets

(51) Int. Cl.
  *A01F 12/40* (2006.01)
  *A01D 41/10* (2006.01)
  *A01D 41/04* (2006.01)

(52) U.S. Cl.
  CPC .............. *A01F 12/40* (2013.01); *A01D 41/04* (2013.01); *A01D 41/10* (2013.01); *A01D 41/1276* (2013.01)

(56) References Cited

U.S. PATENT DOCUMENTS

| | | |
|---|---|---|
| 2005/0059445 A1 | 3/2005 | Niermann et al. |
| 2006/0189362 A1 | 8/2006 | Niermann et al. |
| 2014/0088840 A1 | 3/2014 | Baumgarten et al. |
| 2015/0208579 A1* | 7/2015 | Patterson ................ A01F 12/58 460/112 |
| 2015/0351322 A1 | 12/2015 | Desmet et al. |
| 2016/0088794 A1 | 3/2016 | Baumgarten et al. |
| 2016/0106040 A1* | 4/2016 | Biggerstaff ........ A01D 41/1243 460/112 |
| 2016/0192587 A1* | 7/2016 | Ballegeer ........... A01D 41/1243 |

FOREIGN PATENT DOCUMENTS

| | | |
|---|---|---|
| EP | 1 514 466 A2 | 3/2005 |
| EP | 1 790 207 A1 | 5/2007 |
| EP | 2 712 754 A1 | 4/2014 |
| EP | 3 000 303 A1 | 3/2016 |
| WO | WO 2014/118239 A1 | 8/2014 |

\* cited by examiner

COMBINE HARVESTER HAVING A DRIVER ASSISTANCE SYSTEM

CROSS REFERENCE TO RELATED APPLICATION

This application claims priority to German Patent Application No. DE 102016118187.0, filed Sep. 27, 2016, the entire disclosure of which is hereby incorporated herein by reference.

TECHNICAL FIELD

This application relates generally to agricultural work machines, and specifically relates to a combine harvester including a driver assistance system that regulates the spreading on the ground of a crop flow exiting the combine harvester.

BACKGROUND

The non-grain constituents harvested by a combine harvester during the harvesting operation are often spread directly on the harvested soil, for example, to improve the quality of the soil. In so doing, it is a focus that the spread crop decomposes readily so that its nutrient components are available in the subsequent vegetation phase. An optimal decomposition is achieved when the crop spread on the ground is in suitably short pieces and is distributed homogenously across the working width of the combine harvester.

One example is disclosed in EP 0 685 151, which illustrates a system in which the wind conditions in the region of the crop spreading device of the combine harvester are determined and the discharge behavior of the spreading device is regulated according to the wind conditions.

Another example is EP 1 790 207, which discloses a system in which the spreading of the crop flow exiting the combine harvester in the rear region thereof is regulated depending on the location of the crop edge.

Still another example is EP 1 514 466, which discloses a combine harvester having a chopper and spreading unit and an infrared camera in its rear region. The infrared camera, with the help of the detected temperature distribution, senses the quality of the distribution of the broken straw-chaff mixture deposited on the ground, wherein higher temperatures are an indicator of a greater crop volume. Based on the determined temperature change, kinematic parameters of the crop shredding and spreading device are adjusted such that a substantially uniform temperature distribution over the spreading width ensues, which ultimately is an indicator of homogeneous crop spreading.

The driver assistance system in DE 10 2014 113 965 discloses spreading of the crop on the ground by having various spreading strategies be selectable depending on the detected crop and environmental parameters, in order to optimize crop spreading on the ground.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Figure 1:
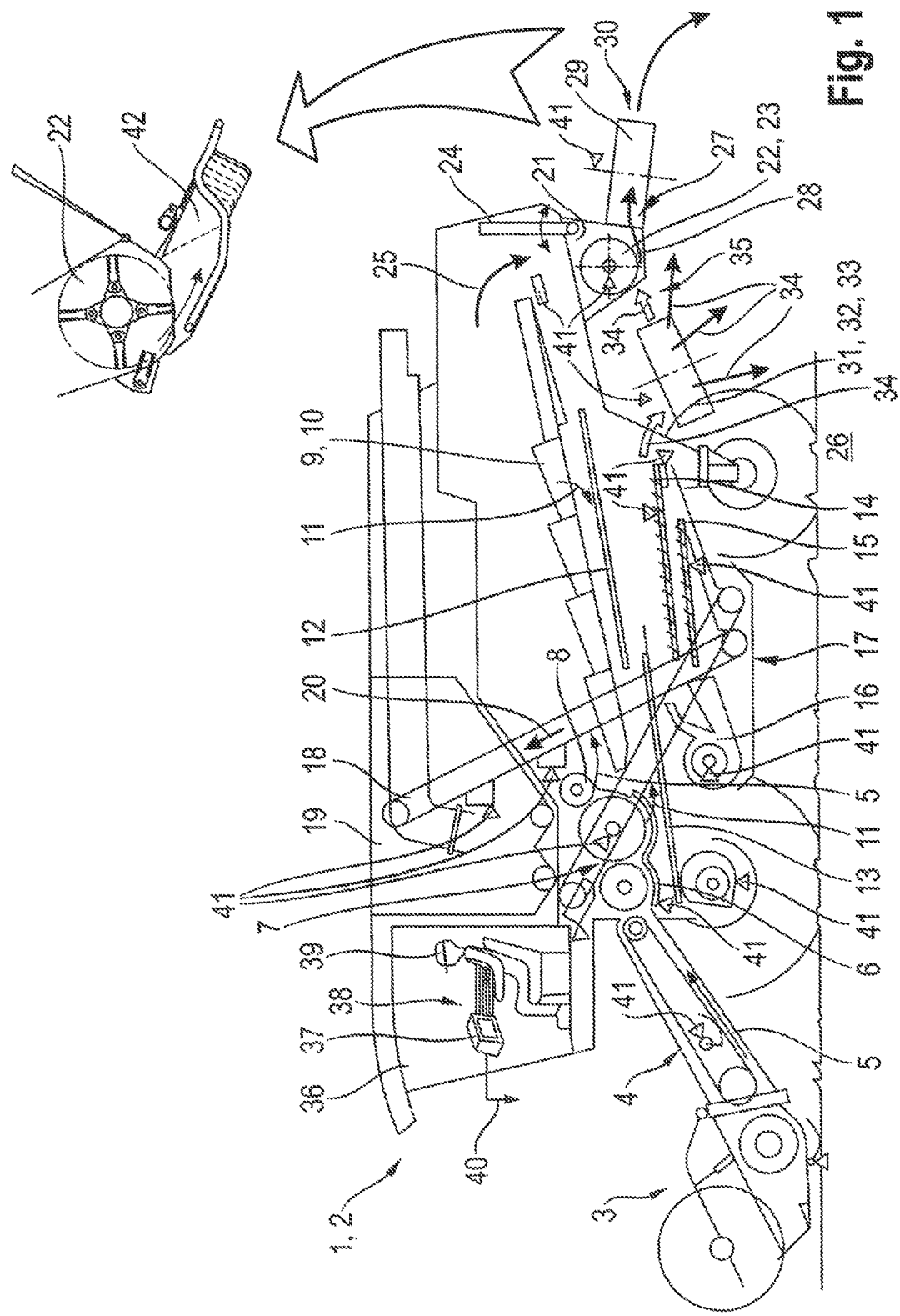
FIG. 1 illustrates the side view of an agricultural working machine designed as a combine harvester.

Some of the systems described in the background only evaluate one defined parameter in order to determine the spreading or distribution quality. Such systems are incapable of detecting complex interrelationships between highly diverse parameters that influence the homogeneity of crop spreading.

Other systems, such as DE 10 2014 113 965, apply different spreading strategies with more parameters considered when determining optimized distribution conditions. However, even such analysis between crop and machine parameters within specific spreading strategies are limited. In that regard, in one implementation, a driver assistance system is disclosed that better detects and accounts for the complex interrelationships between highly diverse parameters, which influence the spreading of the crop on the ground.

As discussed in more detail below, the combine harvester includes: a driver assistance system that regulates the spreading on the ground of a crop flow exiting the combine harvester; a computing unit configured to process information generated by the machine's internal sensor systems, external information and information that can be stored in the computing unit; a display unit; and a shredding and/or spreading device in the rear region of the combine harvester, through which the crop flow (or crop strand) passes to be spread on the ground.

Further, the driver assistance system stores selectable spreading or distribution strategies that regulate the spreading or distribution of the crop flow exiting the combine harvester. In the selection of a spreading strategy, the driver assistance system may process one or more of the partial strategies assigned to the respective spreading strategy. A partial strategy may be assigned to the respective spreading strategy in one of several ways. In one way, a specific partial strategy may be tagged (such as tagged in memory) to assign the specific partial strategy to the respective spreading strategy. In another way, the respective spreading strategy may use a pointer or the like to the specific partial strategy assigned to it. In one implementation, the one or more partial strategies comprise one or more partial spreading strategies. In this regard, the driver assistance system is configured to detect and account for the complex interrelationships between highly diverse parameters, which in turn influences the spreading of the crop on the ground.

In one implementation, the processing of a spreading or distribution strategy and/or of a partial strategy or of a combination of several spreading strategies and/or several partial strategies is selected by the driver of the combine harvester or is proposed by the driver assistance system.

Thus, the driver assistance system may be used flexibly for the optimization of the spreading of the crop flow exiting the combine harvester. As described subsequently, spreading and distribution are used interchangeably.

In another implementation, the selectable spreading strategies comprise at least one of or several of the following spreading strategies: "uniform crop spreading"; "chop quality"; and "energy efficiency". The spreading strategy "uniform crop spreading" causes an optimization of the spreading of the crop flow on the ground. The spreading strategy "chop quality" (also known as "chaff quality") results in an optimization of the shredding of the crop flow in the shredding device. And, the spreading strategy "energy efficiency" results in optimization of the energy requirements for the shredding and spreading of the crop flow. Thus, in addition to considering optimization of the spreading on the ground of the crop flow exiting the combine harvester, other factors, such as a low energy demand and a rapid decomposition of the material spread on the ground, may be taken into consideration.

The driver assistance system may consider one or more partial strategies in analyzing the spreading strategy "uniform crop spreading". In this regard, the driver assistance system may allow for the optimization of the crop spreading to consider a multitude of parameters influencing the crop distribution, so that the driver assistance system reacts flexibly to changing conditions. In this context, in a partial strategy, the driver assistance system measures the mass of the proportional crop flow exiting the spreading device and the area percentage of the ground upon which the sensed portion of the crop flow is spread, and determines the crop distribution on the area percentage of the ground from these measurements. In this way, the driver assistance system may better maintain a homogeneous spreading of the crop on the actual harvested patch.

Another partial strategy may depend on the travel speed and the partial width load of the grain header assigned to the combine harvester. In this partial strategy, the driver assistance system may determine the processed area percentage and the spreading of the exiting crop flow is limited to this area percentage of the ground. This may improve the limitation of the spreading of the crop flow exiting the combine harvester to the actual harvested patch.

In still another implementation, the partial strategy may be directed to determining the crop throughput and its transverse spreading in the combine harvester. In this partial strategy, if a change in the discharge direction and/or speed of the crop flow from the spreading device is performed depending on the determined throughput and the determined transverse spreading, negative influences in the event of a non-optimal crop flow structure can be compensated in the crop spreading of the exiting crop flow. In having a further partial strategy consider the detection of the travel speed relative to the throughput-dependent travel speed change and causing a change in the discharge direction and/or speed of the crop flow depending on the detected travel speed change, it may enable that partial travel speed changes do not negatively impact the spreading of the crop flow exiting the combine harvester.

In still another partial strategy, the wind parameters of wind strength, wind speed, wind direction are detected and, a change in the discharge direction and/or speed of the crop flow may be performed depending on these detected wind parameters. In this way, the negative influence of external wind conditions on the crop spreading on the ground may be reduced.

In another implementation, still another partial strategy can detect the slope gradient, responsive to the detected slope gradient, change the discharge direction and/or speed of the crop flow. In this way, the crop distribution may be changed, such as when going up a slope and/or going down a slope, so that an optimal crop spreading results over the entire spreading width.

In still another implementation, for compensation of the known negative influences of the straw moisture on the flight behavior of the crop flow exiting the combine harvester, yet another partial strategy may be used. In this partial strategy, the straw moisture is detected and a change occurs in the discharge direction and/or speed of the crop flow depending on the detected straw moisture. In this way, the flight behavior of a very dry crop may be increased by increasing the particle size, which at the same time also lowers the energy requirements. In addition, in the case of very damp crop, the kinetic energy to be added in the radial spreader can be reduced, since the damp crop flies further than dry crop. In this context, in a further implementation, the driver assistance system may use a partial strategy that increases the spreading width of the spreading device in the event of decreasing crop throughput, since in the event of decreasing crop throughput, the mass to be spread declines and the resistance of the ambient air counteracts the spreading effect.

Due to the improved flight behavior of very damp crops, the spreading strategy "uniform crop spreading" may be coupled with a partial strategy that increases the pendulum frequency of the deflector plates of the radial spreader with increasing straw moisture.

The spreading strategy "chop quality" may consider one or more partial strategies. In this way, the driver assistance system may optimize the decomposition behavior of the crop flow to be spread considers a plurality of parameters that influence the decomposition effect. In this way, the driver assistance system may react differently and flexibly to changing conditions. In this context, a very efficient influencing of the particle size of the crop flow exiting the combine harvester may be achieved when the available partial strategies comprise a stepped swiveling or pivoting of the counter blades and/or the swiveling or pivoting of the rub bar or friction strip.

Similarly, a method is disclosed for operation of the crop spreading device that may improve or optimize energy requirements, improve good decomposition and achieve improved crop spreading when the spreading strategy "energy efficiency" further considers one or more partial strategies. In the case of improved decomposition, tendency or improved flight properties of the crop flow exiting the combine harvester, the driver assistance system may use a partial strategy that causes a reduction in the energy requirements, such as by means of a stepped swiveling out of the counter blades and/or a swiveling out of the rub bar. In this way, the energy requirements of the crop distribution may be significantly reduced.

In one implementation, this effect may be further increased when another partial strategy determines the decomposition suitability of the crop flow to be spread on the ground and sets a required chop length in the shredding device depending on the determined decomposition suitability. The same effect may also be achieved, whereby the partial strategy may change the chop length depending on the detected straw moisture. In this way, with decreasing crop moisture, a greater chop length is set and/or the chop length is set longer, thus improving the decomposition suitability.

In another implementation, in the case of indirect detection of the results of the spreading strategy "energy efficiency", one or more of the influence quantities may be considered. Examples of influence quantities include: speed of the shredding device; speed of the main drive; crop throughput; material properties; transverse and longitudinal distribution in the chopper rub bar, counter blade and shear bar parameters.

In a further implementation, the driver assistance system may account for the complex relationships of the various parameters influencing the spreading on the ground of the crop flow exiting the combine harvester. The driver assistance system may consider the various parameters sufficiently well when one or more partial strategies causing the regulation of the spreading of the crop flow exiting the combine harvester are stored in characteristic curve fields in the computing unit.

The agricultural work machine 1 schematically represented in FIG. 1. The agricultural work machine 1 may be designed as a combine harvester 2. The agricultural work machine 1 may include a grain header 3 (or cutter bar) in its front region, which is connected in a manner, known to those skilled in the art, to the slope conveyor 4 of the combine harvester 2. The crop flow 5 passing through the slope conveyor 4 is transferred in the top, rear region of the slope conveyor 4 to the threshing members 7 of the combine harvester 2, which are at least partially covered or enclosed on the underside by a so-called thresher basket 6. The threshing member 7 comprises a threshing mechanism. A deflector drum 8, arranged downstream of the threshing members 7, diverts the crop flow 5 exiting the rear region of the threshing members 7 such that it is directly transferred to a separating device 10 designed as a straw walker 9. It is contemplated that the separating device 10 may also be designed as a separating rotor, known to those of skill in the art and therefore not depicted in the figure. The crop flow 5 is conveyed on the rotating straw walker 9 such that free moving grains 11 contained in the crop flow 5 are separated in the bottom region of the straw walker 9. Both the grains 11 separated on the thresher basket 6 as well as the grains 11 separated on the straw walker 9 are supplied via the returns pan 12 and feeder floor 13 of a cleaning device 17 comprising several sieve levels 14, 15 and a blower 16. The cleaned grain flow 20 is finally transferred by means of elevators 18 to a grain tank 19.

A shredding device 23, designed as a straw chopper 22 encased by a funnel-shaped housing 21 and described in greater detail below, is assigned to the rear region of the separating device 10 designed as a straw walker 9. The straw 25 exiting the straw walker 9 in the rear region is supplied to the straw chopper 22 above. The straw 25 exiting the straw walker 9 can also be diverted by means of a pivotable straw deflector flap 24 such that it is placed directly on the ground 26 in a swath. In the outlet region 27 of the straw chopper 22, the crop flow 28, comprising the shredded straw 25, is passed to a so-called radial spreader 29, which discharges the crop flow 28 in its outlet region 30 in a manner described in greater detail below such that there is a wide spread of the crop flow 28 on the ground 26.

As shown in FIG. 1, the cleaning device 17 has a chaff conveying device 31 assigned to its rear region, described in greater detail below, either as a chaff blower 32 or a chaff spreader 33. The chaff exiting the cleaning device 17 is fed to the top of the chaff conveying device 31. The straw may be passed to the straw chopper 22 for the purpose of shredding and spreading on the ground 26 by means of the radial spreader 29. Further, the chaff conveying device 31 is designed as a chaff blower 32. In this case, the chaff 34 conveyed from the chaff blower 32 is directly passed in its rear region to the radial spreader 29, wherein it spreads the shredded straw 25 and the chaff 34 in a single crop flow 28 on the ground 26. If the straw 25 is placed as a swath on the ground 26, the straw chopper 22 and radial spreader 29 are inoperative. In this case, the chaff conveying device 31 is configured as a chaff spreader 33, which, similar to the radial spreader 29, spreads the chaff 34 flat on the ground 26. The chaff conveying device 31 is also designed as a chaff spreader 33 when an ejector hood 42, described further below, is assigned to the straw chopper 22 in place of the radial spreader 29 for spreading the crop flow 28 on the ground 26.

Further, the agricultural work machine 1 has a driver's cab 36 (such as a driver cabin), in which at least one open loop/closed loop control device 38 is arranged, by means of which the agricultural work machine 1 can initiate a plurality of processes, described further below, either automatically or via operator input. The open/closed loop control device 38 comprises a type of control and regulating device, and communicates via a so-called bus system 40 with a plurality of sensor systems 41. Specifics with respect to the structure of the sensor systems 41 are described in detail in US Published Application No. 2003/066277, which is hereby incorporated by reference herein in its entirety.

Figure 2A:
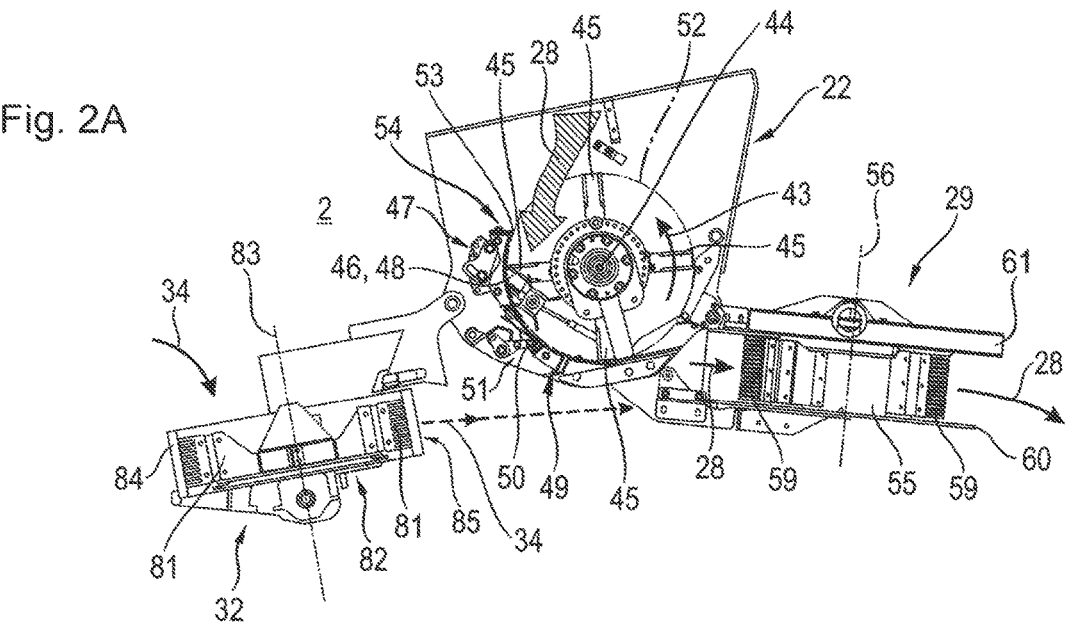
FIGS. 2A-B illustrate a detailed view according to FIG. 1, comprising a straw chopper with a radial spreader and a chaff blower, with FIG. 2A illustrating a lateral view and FIG. 2B illustrating a view from below or underneath.
Figure 2B:
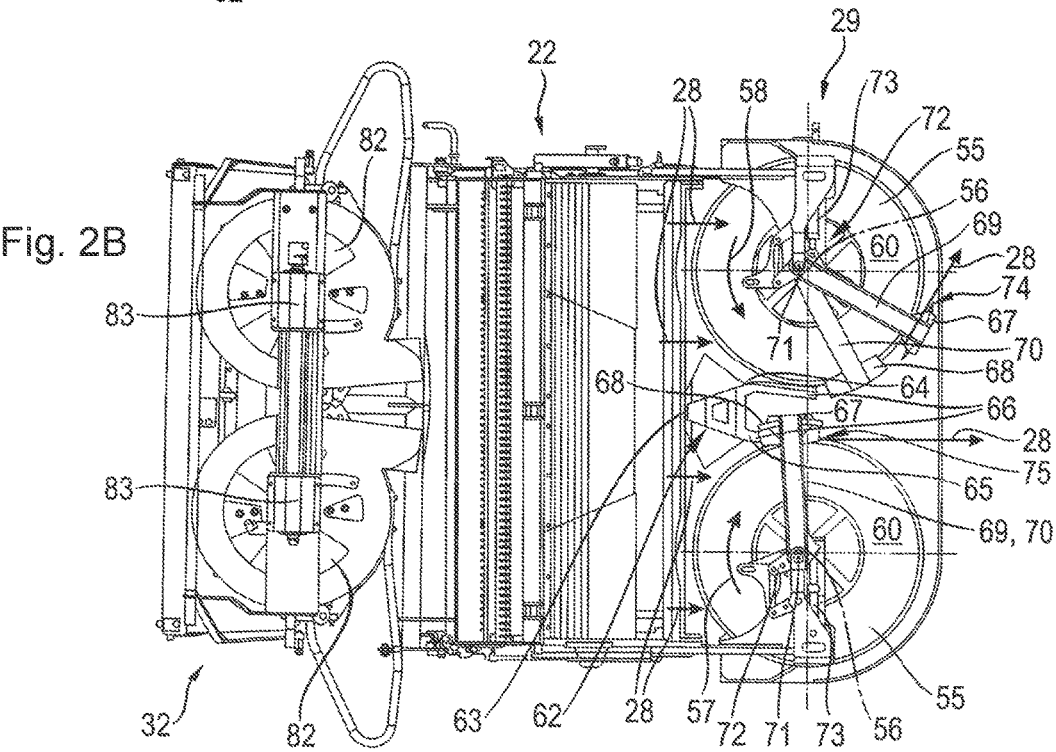

FIGS. 2A-B describe structural details of the straw chopper 22—radial spreader 29 combination in lateral or side view (FIG. 2A), and a view from below (FIG. 2B). As shown in FIGS. 2A-B, the chopper shaft 44, which revolves in the direction of the arrow 43, accommodates four rows of freely movable chopper blades 45 arranged around the periphery of the chopper shaft. In the rear region of the straw chopper 22, the chopper blades 45 mesh with at least one knife bed 46, which is mounted in the frame of the combine harvester 2, wherein the knife bed 46 can be pivoted via adjustment means 47 such that the counter blades 48 of the knife bed 46 can be swiveled further into or out of the effective range of the chopper blade 45. The adjustment means 47 may comprise an actuating means. By changing the position of the knife bed or knife beds 46, the chopper length can be influenced such that with increasing engagement of the counter blades 48, the shredding of the crop flow 28 increases. In addition, the chopper wall 49 encasing the revolving chopper blades 45 accommodates a rub bar 50, which by means of adjustment means 51 can be moved towards or away from the circumferential circle 52 of the chopper blades 45. The adjustment means 51 may comprise an actuating means. An example of the rub bar 50 is a friction strip. The rub bar 50 is configured to curb the speed of the crop flow 28 passing through the straw chopper 22 so that the dwell time of the crop flow 28 in the straw chopper 22 and thus the shredding rate increases. In addition, the chopper wall 49 has a shear bar 53 which can likewise be moved towards or away from the circumferential circle 52 of the chopper blades 45, wherein the shear bar 53 increases the splaying of the particles of the crop flow 28 as the distance to the circumferential circle 52 of the chopper blades 45 decreases.

The radial spreader 29 arranged downstream of the straw chopper 22 comprises two discharge blowers 55 arranged next to one another, which revolve around vertical axes of rotation 56 in accordance with the directions of the arrows 57, 58 opposite to one another and which deliver the crop flow 28 shredded by the straw chopper 22 from the combine harvester 2 and spread it on the ground 26 as described in greater detail below. The axes of rotation 56 are equipped with flexible discharge blades 59, which are covered from below by a co-rotating disk 60 and can be sealed above by cover plates 61. The flexible discharge blades 59 may comprise a winnowing fan. A crop separating plate 62 is assigned to the two discharge blowers 55, which comprise the upper cover plates 61, the axes of rotation 56, the discharge blades 59 and the co-rotating disks 60. The tip 63 of the crop separating plate is directed against the crop flow 28 expelled from the straw chopper 22, so that the crop flow is distributed to the discharge blowers 55. The diverging legs 64, 65 of the crop separating plates 62 form the stationary partial casings 66 for the discharge blowers 55 with their tapering ends. In addition, each discharge blower 55 has first and second movable wall parts, so-called deflector plates 67, 68, which are driven via angle levers 69, 70 around rotational axes 71 revolving such that the external deflector plate 67 precedes the internal deflector plate 68. The deflector plates 67, 68 may comprise spreading plates. The movable deflector plates 67, 68 are each driven via lifting cylinders 73 operatively connected to a coupling mechanism 72 in a manner that the leading deflector plate 67 revolves at a higher speed than the trailing internal deflector plate 68. The front end of the leading deflector plates 67 forms the so-called separation edge 74, 75 over which the crop flow 28 exits the respective radial blower 55. The movement of the angle levers 69, 70 controls the rotating movement of the separation edges 74, 75 such that their swiveling speed decreases with the increasing distance of the separation edges 74, 75 to the respective adjacent discharge blower 55. The angle levers 69, 70 may comprise bell cranks. This causes the separation edges 74, 75 to have shorter dwell times in their overlapping region and longer dwell times in the external regions, so that the crop flow 28 exiting to the separation edges 74, 75 ensures a homogeneous spreading on the ground 26. In addition, the pivoting range of the separation edges 74, 75 and with it the spreading width of the radial spreader 29 can be adjusted. A chaff blower 32 is assigned to the lower region of the straw chopper 22 facing away from the radial spreader 29. The chaff blower 32 has a discharge blower 82 furnished with conveying elements 81, which is driven around a vertical axis 83. The cover 84 of the chaff blower 32 is constructed such that it has an opening 85 pointing in the direction of the radial spreader 29 over which the chaff 34 discharged by the cleaning device 17 is conveyed to the crop flow 28 entering the radial spreader 29. It contemplated that the chaff blower 32 has at least revolving discharge blowers 82 arranged by pairs.

Figure 3A:
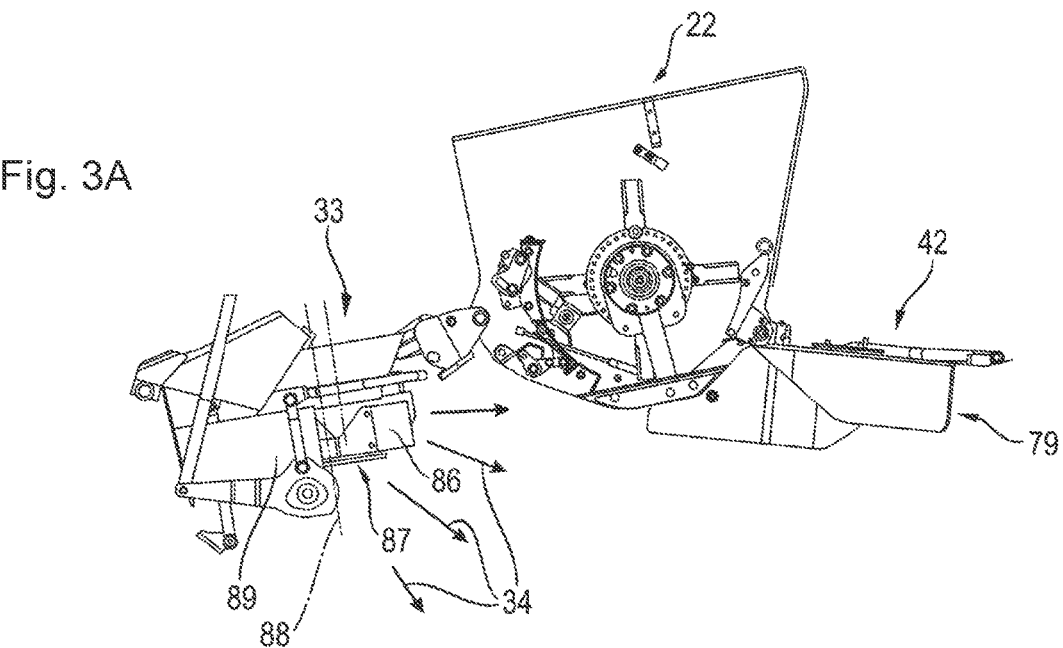
FIGS. 3A-B illustrates a detailed view according to FIG. 1, comprising a discharge hood and a chaff spreader, with FIG. 3A illustrating a lateral view and FIG. 3B illustrating a view from below or underneath.
Figure 3B:
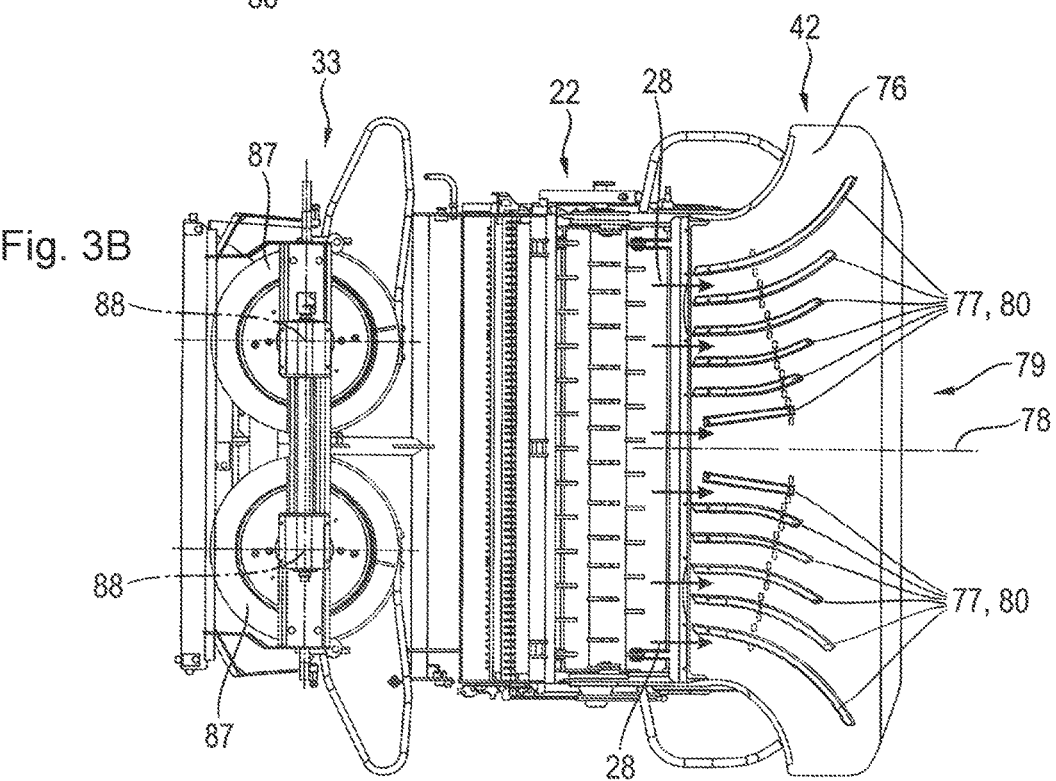

FIGS. 3A-B describes structural details of the straw chopper 22—radial spreader 29 combination in lateral or side view (FIG. 3A) and a view from below or underneath (FIG. 3B). Since the straw chopper 22 corresponds to the one from FIGS. 2A-B, only the details of the straw ejector hood 42 and the chaff spreader 33 will be described. The straw ejector hood 42 may be formed by a cover hood 76 forming a top and lateral boundary, to which a plurality of crop guide rails 77 are assigned in an interior thereof. The crop guide rails 77 have left and right orientations with respect to a middle region 78, so that the crop flow 28 entering the straw ejector hood 42 exits the outlet region 79 of the straw ejector hood 42 either right-oriented or left-oriented. The crop guide rails 77 can be formed either by flat web plates 80 or by web plates that can have their curvature changed. In addition, the orientation of the crop guide rails 77 in the cover hood 76 can be adjusted, so that its transverse conveying effect is either increased or decreased. A chaff spreader 33 is assigned to the straw chopper 22 in its lower region averted from the straw ejector hood 42. The chaff spreader 33 has a discharge blower 87 provided with conveying elements in its interior which is driven around a vertical axis 88. The cover 89 of the chaff spreader 33 is constructed such that the chaff discharged from the cleaning device 17 is directly spread on the ground 26. It is contemplated that the chaff spreader 33 has at least revolving discharge blowers 87 arranged in pairs.

Figure 4:
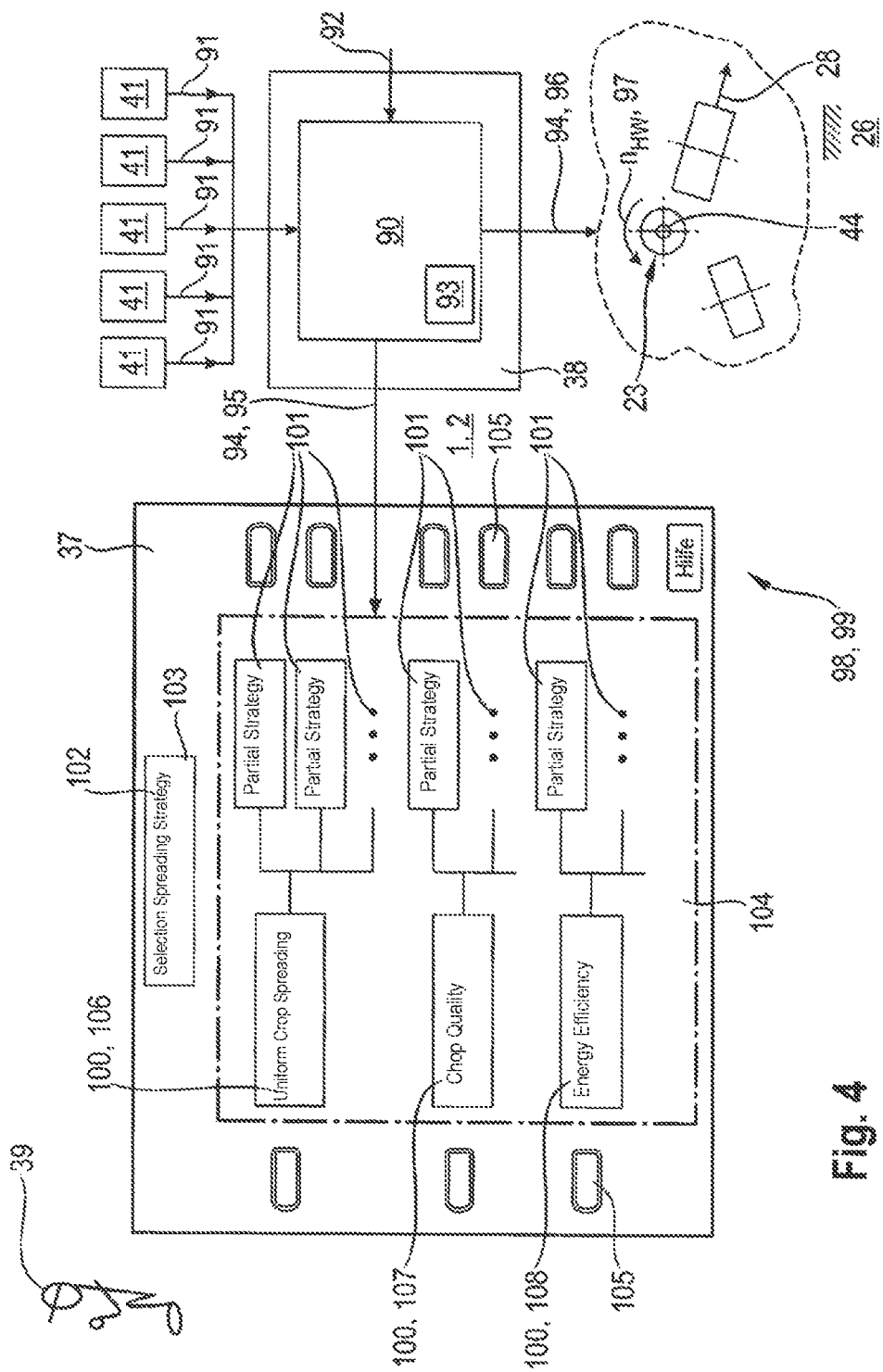
FIG. 4 illustrates a schematic view of the driver assistance system in one implementation.

FIG. 4 shows a schematic representation of the display unit 37, the open loop/closed loop control device 38 as well as a computing unit 90 assigned to the open loop/closed loop control device 38 and coupled to the display unit 37. The display unit 37 comprises an example of an output device. The combine harvester may include an input/output (I/O) unit, with the input unit being used by an operator 39 to input information, such as commands (e.g., one or more spreading strategies 100 and/or one or more partial strategies 101). Further, the I/O unit may be configured to output information to the operator 39. As one example, the I/O unit may be configured to output a confirmation of the operated selected spreading strategy(ies) 100 and/or partial strategy(ies) 101. As another example, the I/O unit may be configured to output to the operator 39 the spreading strategy(ies) 100 and/or partial strategy(ies) 101 selected by the computing unit 90. In one implementation, responsive to the output of the computing unit 90 selections, the operator may confirm the computing unit selections. In another implementation, the computing unit 90 simply outputs the selections for operator information and not for conformation. Responsive to the determination as to the selected spreading strategy(ies) 100 and/or the partial strategy(ies) 101, the computing unit 90 may access the selected spreading strategy(ies) 100 and/or the partial strategy(ies) 101 from a memory. For example, responsive to operator selection, the computing unit 90 may access the spreading strategy(ies) 100 and/or the partial strategy(ies) 101 selected by the operator from the memory. As another example, responsive to the computing unit 90 selections, the computing unit 90 may access the spreading strategy(ies) 100 and/or the partial strategy(ies) 101.

The computing unit 90 can take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. In particular, the computing unit 90 may comprise logic, such as computable executable instructions, which enable the use of the spreading strategies 100 and/or partial strategies 101 disclosed herein. The computing unit 90 can be configured with hardware and/or firmware to perform the various functions described below and shown in the flow diagrams. Also, some of the components shown as being internal to the computing unit 90 can also be stored external to the computing unit 90, and other components can be used. As such, the computing unit 90 may comprise processor(s) in communication with one or more memories, with the one or more memories storing the selectable spreading strategies (100) and the partial strategies (101), discussed further below.

The computing unit 90 is constructed such that, along with information 91 generated by the sensor systems 41, the computing unit 90 may also process external information 92 and information stored in the computing unit 90 itself, for example expert knowledge, into a plurality of output signals 94. The output signals 94 are, in the process, constructed such that they comprise at least display control signals 95 and working element control signals 96. Display control signals 95 determine the contents of the display unit 37 and working element control signals 96 change the diverse working element parameters 97 of the agricultural work machine 1, such as for example the speed nHw of the chopper shaft 44, with the objective of achieving a homogeneous spreading on the ground 26 of the crop flow 28 exiting the combine harvester 2. The open loop/closed loop control device 38 with its associated display unit 37 and the computing unit 90 are part of the driver assistance system 98. The driver assistance system 98 is designed as a so-called automatic chopper and spreader 99, which optimizes the spreading of the crop flow 28 on the ground 26.

The driver assistance system 98 may be designed such that it comprises selectable and editable spreading strategies 100 for regulating the spreading of the crop flow 28 exiting the combine harvester 2. In one implementation, each spreading strategy 100 has partial strategies 101 assigned to it, so that in the case of the selection of a spreading strategy 100, in each case, one or more partial strategies 101 coupled to the selected spreading strategy 100 are processed. FIG. 4 illustrates one manner of connecting or associating the spreading strategy 100 with a respective partial strategy 101. Either the operator 39 or the driver assistance system 98 may first select a spreading strategy 100 and/or partial strategy 101 or a combination of several spreading strategies 100 and/or several partial strategies 101. In one implementation, the display unit 37 is designed as a touch screen. In this context, the operator 39 can provide a touch input to select a suitable strategy 100, 101 by touching the respective field on the touch screen. In a first menu step 102, an additional menu item 104 can be opened by activation of a "Select Strategy" menu item 103 in which the spreading strategies and the associated partial strategies can then be selected. It is also contemplated that the respective strategies 100, 101 are selected by pressing buttons 105 assigned by the display unit 37.

One particularly efficient optimization of the distribution is achieved when the selectable spreading strategies comprise at least one or more of the spreading strategies "uniform crop spreading" 106, "chop quality" 107 and "energy efficiency" 108. The spreading strategy "uniform crop spreading" 106 optimizes the spreading of the crop flow 28 on the ground 26. The spreading strategy "chop quality" optimizes the shredding of the crop flow 28 in the shredding device 23, while the spreading strategy "energy efficiency" 108 optimizes the energy requirements for the shredding and spreading of the crop flow 28.

Figure 5:
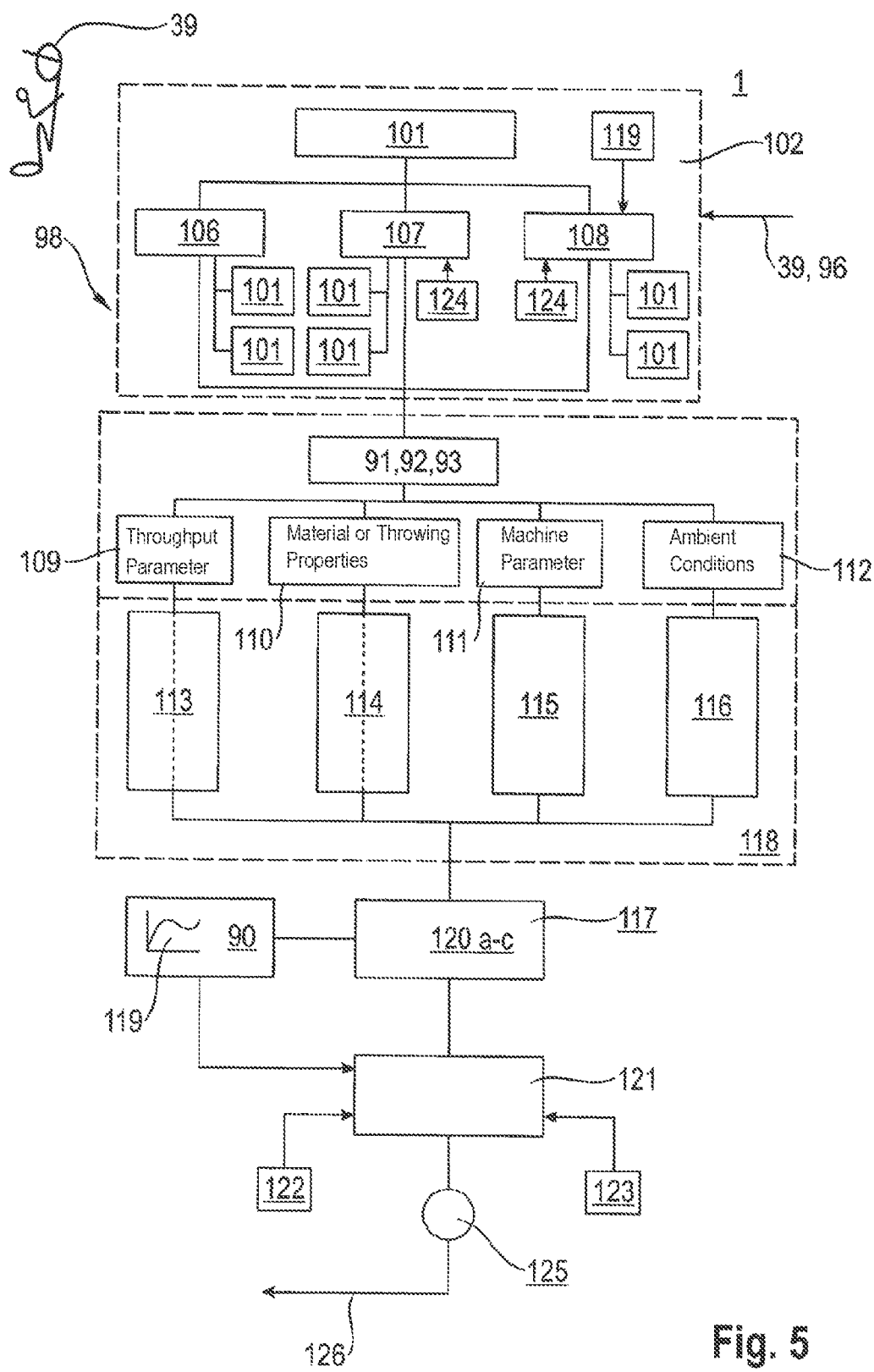
FIG. 5 illustrates another schematic view of the driver assistance system according to FIG. 4.

FIG. 5 schematically describes details of the spreading strategies 100 and of the partial strategies 101. In the first menu step 102 a spreading strategy 106-108 and the respective partial strategies 101 or a combination of several distribution and partial strategies 106-108, 101 are selected by the operator 39 (or driver) of the combine harvester 2 or proposed by (or automatically selected by) the driver assistance system 98. Each of the spreading strategies 106-108 and the partial strategies 101, which are described in greater detail below, considers a plurality of information 91-93 accessible in the driver assistance system 98. In one implementation, this information comprises at least the information "throughput parameters" 109, "material or throwing properties" 110, "machine parameters" 111 and "ambient conditions" 112.

The throughput-dependent influence on the spreading of the crop flow 28 on the ground 26 is sufficiently well detected when the information "throughput parameters" 109 comprises any one, any combination or all of the following throughput-relevant parameters 113: grain throughput; crop volume in a slope conveyor 4 assigned to the combine harvester 2; driver engine load; drive power requirements of the shredding device 23; drive power requirements of the spreading devices radial spreader 29; chaff conveying device 31; and/or ejector hood 42 and/or transverse and longitudinal spreading of the crop flow 28 in the shredding device 23.

The throwing property-dependent influence on the crop spreading on the ground 26 is well-detected when the information material and throwing properties 110 comprise any one, any combination, or all of the following throwing property-relevant parameters 114: straw moisture; chop length; splaying; crop density; toughness; and crop type.

The machine parameter dependent influence on the shredding device 23 is sufficiently well-detected when the shredding device 23 is designed as a straw chopper 22 and the crop flow 28 is shredded in the straw chopper 22 in cooperation with revolving chopper blades 45 with stationary counter blades 48, one or more shear bars 53 and one or more rub bars 50. Further, the information "machine parameters" 111 comprises any one, any combination, or all of the machine-relevant parameters 115: number and position of the rub bars 50, of the counter blades 48, of the shear bars 53; wear parameters of the chopper blades 45; and speed parameters of the chopper shaft 44.

In the event that the spreading device is configured as a radial spreader 29, which comprises at least deflectable deflector plates 67, 68 and one or more discharge blowers 55, the machine-parameter-dependent influence on the spreading of the crop flow 28 on the ground 26 is sufficiently detected when the information 'machine parameters" 111 comprises any one, any combination, or all of the machine-relevant parameters 115: deflection; pendulum frequency and spreading curve of the deflector plates 67, 68; speed parameters of the discharge blowers 55; and revolving working elements of the combine harvester 2 arranged upstream. On the other hand, in the event that the spreading device is configured as a chaff blower 32 or chaff spreader 33, the machine-relevant parameters 115 comprise any one, any combination, or all of: the speed of the discharge blowers 82, 87 assigned to the chaff blower 32 or the chaff spreader 33. If the spreading device spreading the crop flow 28 on the ground 26 is configured as an ejector hood 42 equipped with crop guide rails 77, the machine-relevant parameters comprise at least the orientation of the crop guide rails 77 in the ejector hood 42.

The environment-dependent influence on the spreading of the crop flow 28 on the ground 26 is sufficiently well-detected when the information "ambient conditions" 112 comprises any one, any combination, or all of the environment-relevant parameters 116 (e.g., ambient conditions): humidity and temperatures; wind parameters such as wind speed and wind direction; and slope gradient parameters.

The driver assistance system 98 may process in a next menu step 117 the respective spreading strategy 100 as well as the at least one partial strategy 101 assigned to it considering the available information 118 and the characteristics 119 stored in the computing unit 90, in order to optimize the quality criteria crop distribution 120a, chop quality 120b and energy requirements 120c. Finally, in a Results menu step 121, the quality criteria 120a-c optimized by the respective spreading strategy 106-108 and the at least one partial strategy 101 are then verified, with the verification occurring directly and/or indirectly.

In the processing of the spreading strategy "uniform spreading" 106, the direct verification of the spreading on the ground of the crop flow 28 exiting the combine harvester 2 is effected by direct sensing of the distribution, for example by means of camera or laser systems. The indirect detection may take place, for example by processing the characteristic curve fields 119 stored in the computing unit 90.

Similarly, in the processing of the spreading strategy "chop quality" 107, the direct detection of the results occurs by crop stream detection by means of crop analysis sensors known per se, such as NIR sensors. The indirect detection may occur by processing a chop quality model 122 stored in the computing unit 90, wherein the chop quality model 122 for example adjusts the chop length depending on the detected crop properties.

In the processing of the spreading strategy "energy efficiency" 108, the direct detection of the results occurs by torque and/or speed and/or engine load measurement. The indirect detection occurs by processing an energy efficiency model 123 stored in the computing unit 90, wherein the energy efficiency model 123, similar to the chop quality model 122, varies the drive energy requirements depending on crop properties.

The optimization of the quality parameters chop quality 120$b$ and energy requirements 120$c$ can also be improved by combination with one another or balancing the spreading strategies "chop quality" 107 and "energy efficiency" 108 stored in the driver assistance system 98 as well as the partial strategies 101 assigned to them. By way of background, the quality parameters chop quality 120$b$ and energy requirements 120$c$ have contrary tendencies, since the energy requirements are higher, the finer the crop flow 28 is shredded to promote a rapid decomposition. In this context, it may be beneficial when the operator 39 of the combine harvester 2 performs any one, any combination, or all of the following: defines one or more limits 124, such as for chop quality 120$b$ and/or energy requirements 120$c$; prioritizes one of the spreading strategies, such as the spreading strategies "chop quality" 107 and "energy efficiency" 108, as well as the associated partial strategies 101; or changes the weighting of these spreading strategies 100 and the associated partial strategies 101.

In a further menu step 125, the driver assistance system 98 may effect a change of machine parameters 111 under consideration of the specifications of the operator 39 and the stored characteristics 119, 122, 123. Finally, the optimization process can be cyclically repeated in the art of a control loop 126, wherein the cyclical repetition occurs either automatically or is triggered by the operator 39.

Figure 6:
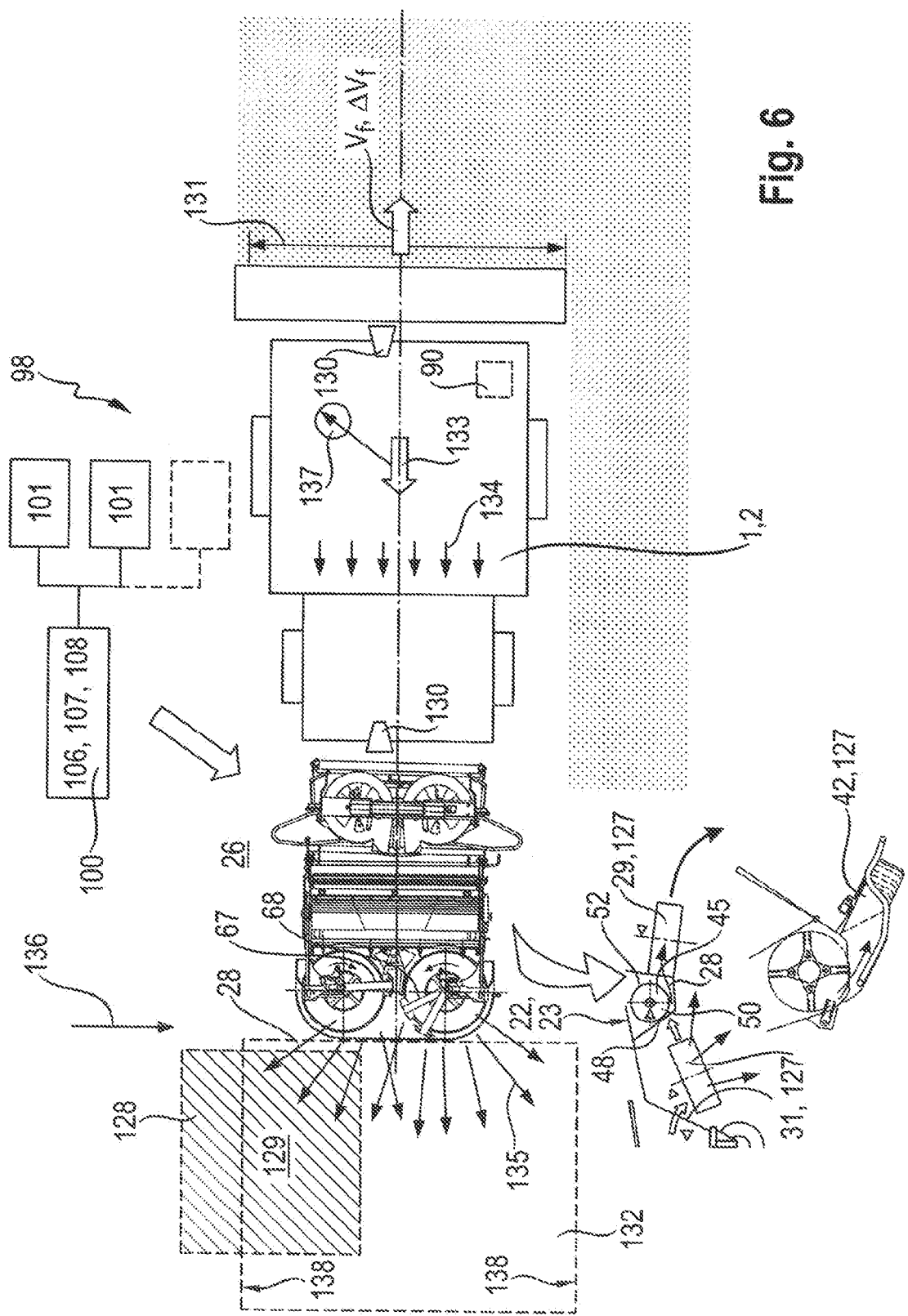
FIG. 6 illustrates a schematic representation of an application of the driver assistance system in one implementation.

FIG. 6 shows the relationships stored in the spreading strategies 100 and the partial strategies 101 assigned to them as an example in a specific application. The spreading strategy "uniform crop spreading" 106 is constructed such that it can comprise a plurality of partial strategies 101. In a first partial strategy 101, the driver assistance system may determine the mass of the proportional crop flow 28 exiting the spreading device 127 (designed as a chaff conveying device 31, as a radial spreader 29 or ejector hood 42) and the area percentage 128 of the ground 26 (upon which the sensed portion of the crop flow 28 is spread is measured and the crop spread 129 on the area percentage 128 of the ground 26). In one simple application case, the quantity of the exiting crop flow 28 and the associated area percentage 128 can be detected by means of suitable camera systems 130 positioned on the agricultural work machine 1.

In a further partial strategy 101 the processed area percentage 132 is determined depending on the travel speed vf and the partial width load 131 of the grain header 3 assigned to the combine harvester and the spreading of the exiting crop flow 28 on this area percentage 132 of the ground 26 is limited. This has the advantage that the exiting crop flow 28 is only spread where harvesting also takes place. It lies within the scope of the invention that the processed area percentage 132 can be determined by camera systems 130 positioned on the front of the combine harvester 2.

A partial strategy 101 may also be constructed such that the crop throughput 133 and its transverse spreading 134 are determined by means of suitable sensors in the combine harvester 2 and the discharge direction and/or speed 135 of the crop flow 28 from the respective spreading device 127 are regulated depending on the determined throughput 133 and the determined transverse spreading 134. The transverse spreading 134 may comprise spreading in the lateral direction.

A further partial strategy 101 may be directed at having the travel speed vf (e.g., the driving speed of the combine harvester) determined in relation to the throughput-dependent travel speed change Δvf (e.g., change in the driving speed of the combine harvester) and the discharge direction and/or speed 135 of the crop flow 28 regulated depending on the detected travel speed change Δvf. This may be used when a so-called cruise control is employed which sets a constant crop throughput 133 by adjusting the travel speed vf of the agricultural work machine 1.

In a further partial strategy 101, at least the wind parameters 136 wind strength, wind speed, wind direction are sensed and the discharge direction and/or speed 135 of the crop flow 28 are adjusted depending on the detected wind parameters 136.

In similar manner, in a further partial strategy 101, the slope gradient can be determined and the discharge direction and/or speed 135 of the crop flow 28 can be regulated depending on the determined slope gradient, wherein the crop portion to be conveyed up the slope increases compared to the crop portion to be conveyed down the slope.

One further partial strategy 101 can be constructed such that, depending on the determined straw moisture 137, changes the discharge direction and/or speed 135 of the crop flow 28. In this manner, the aerodynamic properties of the exiting crop flow 28 that change depending on the dampness can be better considered. For example, with increasing straw moisture 137 the friction between the crop flow 28 and the guide elements of an ejector hood 42 increases, so that the throw range of the exiting crop flow 28 decreases, while the throw range increases in the case of spreading by means of radial spreader 29 with increasing straw moisture 137. In both cases, the combine harvester is steered in the opposite direction to ensure that the exiting crop flow 28 is uniformly spread on the ground 26, and in particular on the respective area percentage 132.

Similarly, the driver assistance system may use still another further partial strategy 101 to analyze, in the case of decreasing crop throughput 133 that the spreading width 138 of the respective spreading device 127 is increased. Thus, this partial strategy 101 may be used to increase the spreading width 138 in the event of decreasing crop throughput 133 (or decreasing crop flow). This is due to the fact that a lighter crop flow 28 is more severely curbed by the air and wind resistance and thus does not fly as far.

Yet another partial strategy 101 may be used for straw moisture 137. In particular, this partial strategy 101, directed at the straw moisture 137, increases the pendulum frequency of the deflector plates 67, 68 with increasing straw moisture 137.

In one implementation, the spreading strategy "chop quality" 107 is constructed such that it can comprise one or a plurality of partial strategies 101. For example, the partial strategies 101 assigned to the spreading strategy "chop quality" 107 can be constructed such that they comprise a stepped swiveling (or pivoting) of the counter blades 48 and/or the swiveling (or pivoting) of the rub bar 50. In the course of this, the shredding rate of the crop flow 28 increases with the increasing engagement of the counter blades 48 in the circumferential circle 52 of the chopping blades 45. The same effect occurs when the rub bar 50 is brought closer to the circumferential circle 52 of the chopping blades 45. However, with increasing engagement of the rub bar 50 in the crop flow 28, the friction between the crop flow 28 and the rub bar 50 increases and, as a result, the dwell time of the crop flow 28 in the straw chopper 22 increases.

The spreading strategy "energy efficiency" 108 is similarly constructed such that it can comprise one or a plurality of partial strategies 101. A significant reduction of the energy requirements may be achieved when, in a first partial strategy 101, a stepped swiveling (or pivoting) out of the counter blades 48 and/or a swiveling (or pivoting) out of the rub bar 50 are achieved. The energy requirements are lowered by reducing either the shredding effect or the friction between the crop flow 28 and rub bar 50.

In this context, a further partial strategy 101 can be designed such that the decomposition property of the crop flow 28 to be spread on the ground 26 is determined, and depending on the determined decomposition property a required chop length is set in the straw chopper 22 (which may comprise a shredding device), wherein this is effected in the simplest case by the swiveling in or swiveling out of the counter blades 48 and/or of the rub bar 50. Further, in this context, a partial strategy 101 can also be constructed such that the chop length is set longer, resulting in an improved decomposition property.

In a further partial strategy 101, the chop length may be changeable depending on the detected straw moisture 137. In particular, the chop length may be changeable in such a way that with increasing straw moisture, a greater chop length is set. Such that, on the one hand, a negative effect of the decreasing straw moisture on the throw range can be compensated by increasing the particle size, and on the other hand, a reduction in the necessary shredding energy can be achieved.

In the case of indirect detection of the results of the spreading strategy "energy efficiency" 108, the driver assistance system 98 can in addition be constructed such that it considers one or more of the influence quantities such as, for example: speed of the shredding device 23; speed of the main drive of the agricultural work machine 1; the crop throughput 133; material properties of the crop flow 28; transverse and longitudinal spread in the straw chopper 22 as well as rub bar; and counter blade and shear bar parameters.

In addition, it is contemplated that one or more partial strategies 101 effecting the spreading of the crop flow 28 exiting the combine harvester 2 are stored in characteristic curve fields 119 in the computing unit 90.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

REFERENCE LIST

| | |
|---|---|
| 1 | agricultural working machine |
| 2 | combine harvester |
| 3 | grain header |
| 4 | slope conveyor |
| 5 | crop stream |
| 6 | thresher basket |
| 7 | threshing member |
| 8 | deflector drum |
| 9 | straw walker |
| 10 | separating device |
| 11 | grains |
| 12 | returns pan |
| 13 | feeder floor |
| 14 | sieve level |
| 15 | sieve level |
| 16 | blower |
| 17 | cleaning device |
| 18 | elevator |
| 19 | grain tank |
| 20 | grain flow |
| 21 | housing |
| 22 | straw chopper |
| 23 | shredding device |
| 24 | straw deflector flap |
| 25 | straw |
| 26 | ground |
| 27 | outlet region |
| 28 | crop flow |
| 29 | radial spreader |
| 30 | outlet region |
| 31 | chaff conveying device |
| 32 | chaff blower |
| 33 | chaff spreader |
| 34 | chaff |
| 35 | rear region |
| 36 | driver's cab |
| 37 | display unit |
| 38 | open/closed loop control device |
| 39 | operator |
| 40 | bus system |
| 41 | sensor system |
| 42 | ejector hood |
| 43 | direction of the arrow |
| 44 | chopper shaft |
| 45 | chopping blade |
| 46 | knife bed |
| 47 | adjustment means |
| 48 | counter blade |
| 49 | chopper wall |
| 50 | rub bar |
| 51 | adjustment means |
| 52 | circumferential circle |
| 53 | shear bar |
| 54 | adjustment means |
| 55 | discharge blower |
| 56 | axis of rotation |
| 57, 58 | direction of the arrow |
| 59 | discharge blade |
| 60 | disk |
| 61 | cover plate |
| 62 | crop separating plate |
| 63 | tip |
| 64, 65 | leg |
| 66 | partial casing |
| 67, 68 | deflector plate |
| 69, 70 | angle lever |
| 71 | rotational axis |
| 72 | coupling mechanism |
| 73 | lifting cylinder |
| 74, 75 | separation edge |
| 76 | cover hood |
| 77 | crop guide rail |
| 78 | middle region |
| 79 | outlet region |
| 80 | web plate |
| 81 | conveying element |
| 82 | discharge blower |

| | |
|---|---|
| 83 | vertical axis |
| 84 | cover |
| 85 | opening |
| 86 | conveying element |
| 87 | discharge blower |
| 88 | vertical axis |
| 89 | cover |
| 90 | computing unit |
| 91 | internal information |
| 92 | external information |
| 93 | information |
| 94 | output signals |
| 95 | display control signals |
| 96 | working element control signals |
| 97 | working element parameter |
| 98 | Driver Assistance System |
| 99 | automatic chopper and spreader |
| 100 | spreading strategy |
| 101 | partial strategy |
| 102 | first menu step |
| 103 | menu item |
| 104 | menu item |
| 105 | button |
| 106 | uniform crop spreading |
| 107 | chop quality |
| 108 | energy efficiency |
| 109 | throughput parameter |
| 110 | material or throwing properties |
| 111 | machine parameters |
| 112 | ambient conditions |
| 113 | throughput-relevant parameters |
| 114 | throwing property-relevant parameters |
| 115 | machine-relevant parameters |
| 116 | environment-relevant parameters |
| 117 | further menu step |
| 118 | available information |
| 119 | characteristic |
| 120 | quality criterion |
| 121 | Results menu step |
| 122 | chop quality model |
| 123 | energy efficiency model |
| 124 | limit |
| 125 | menu step |
| 126 | control loop |
| 127 | spreading device |
| 128 | area percentage |
| 129 | crop spread |
| 130 | camera system |
| 131 | partial width load |
| 132 | area percentage |
| 133 | crop throughput |
| 134 | transverse spreading |
| 135 | discharge direction and speed |
| 136 | wind parameter |
| 137 | straw moisture |
| 138 | spreading width |
| $n_{HW}$ | speed of the chopper shaft |
| vf | travel speed |
| Δvf | travel speed change |

The invention claimed is:

1. A combine harvester comprising:
one or more sensors; and
a driver assistance system in communication with the one or more sensors, the driver assistance system comprising a computing unit and a display, the computing unit configured to:
access data generated by the one or more sensors;
access at least one spreading strategy to regulate crop flow exiting the combine harvester;
access one or more partial strategies, the accessed one or more partial strategies assigned to the accessed at least one spreading strategy; and
use the accessed data generated by the one or more sensors, the accessed at least one spreading strategy, and the accessed one or more partial strategies in order to control the spreading of the crop flow exiting the combine harvester.

2. The combine harvester of claim 1, wherein the combine harvester further comprises a spreading device and an input device, the spreading device and the input device in communication with the computing unit;
wherein the computing unit is further configured to receive, via the input device, an operator selection of one or both of the at least one spreading strategy or the one or more partial strategies;
wherein the accessed at least one spreading strategy comprises the operator selection of the spreading strategy; and
wherein the accessed one or more partial strategies comprises the operator selection of the partial strategy.

3. The combine harvester of claim 1, wherein the computing unit is further configured to select of the spreading strategy or the partial strategy;
wherein the accessed at least one spreading strategy comprises the computing unit selected spreading strategy; and
wherein the accessed one or more partial strategies comprise the computing unit selected partial strategy.

4. The combine harvester of claim 1, wherein the driver assistance system comprises a memory configured to store a plurality of spreading strategies, the plurality of spreading strategies comprising one or more of: "uniform crop spreading", "chop quality" and "energy efficiency",
wherein the driver assistance system is configured to use the spreading strategy "uniform crop spreading" to cause an optimization of the spreading of the crop flow on a ground;
wherein the driver assistance system is configured to use the spreading strategy "chop quality" to cause an optimization of shredding of the crop flow in a shredding device of the combine harvester; and
wherein the driver assistance system is configured to use the spreading strategy "energy efficiency" to cause an optimization of energy requirements for the shredding and spreading of the crop flow.

5. The combine harvester of claim 1, further comprising a spreading device in communication with the computing unit;
wherein the driver assistance system comprises a memory configured to store a spreading strategy "uniform crop spreading";
wherein the memory is further configured to store one or more of the following partial strategies assigned to the spreading strategy "uniform crop spreading": a first partial strategy; a second partial strategy; a third partial strategy; a fourth partial strategy; a fifth partial strategy; a sixth partial strategy; a seventh partial strategy; and an eighth partial strategy;
wherein the driver assistance system is configured to use the first partial strategy by: measuring a mass of a proportional crop flow exiting the spreading device and an area percentage of a ground upon which a sensed portion of the crop flow is spread; and determining, based on the mass of the proportional crop flow exiting the spreading device and the area percentage, crop distribution on the area percentage of the ground;
wherein the driver assistance system is configured to use the second partial strategy by: determining, depending on travel speed of the combine harvester and partial width load of a grain header assigned to the combine harvester, a processed area percentage; and limiting the spreading of the exiting crop flow to the processed area percentage of the ground;

wherein the driver assistance system is configured to use the third partial strategy by: determining crop throughput and its transverse spreading in the combine harvester; and changing one or both of discharge direction or speed of the crop flow from the spreading device of the combine harvester depending on the determined throughput and the determined transverse spreading;

wherein the driver assistance system is configured to use the fourth partial strategy by: detecting travel speed relative to throughput-dependent travel speed change; and changing one or both of a discharge direction or speed of the crop flow depending on the travel speed change;

wherein the driver assistance system is configured to use the fifth partial strategy by: detecting wind parameters of wind strength, wind speed, wind direction; and changing one or both of discharge direction or speed of the crop flow depending on the detected wind parameters;

wherein the driver assistance system is configured to use the sixth partial strategy by: detecting slope gradient; and changing one or both of discharge direction or speed of the crop flow depending on the detected slope gradient;

wherein the driver assistance system is configured to use the seventh partial strategy by: detecting straw moisture; and changing one or both of discharge direction or speed of the crop flow depending on the detected straw moisture; and wherein the driver assistance system is configured to use the eighth partial strategy by: detecting decreasing crop throughput; and enlarging spreading width of the spreading device in response to detecting decreasing crop throughput.

6. The combine harvester claim 5, wherein the spreading device comprises a radial spreader having deflector plates; and
   wherein the eighth partial strategy increases pendulum frequency of the deflector plates with increasing straw moisture.

7. The combine harvester of claim 1, further comprising a spreading device in communication with the computing unit;
   wherein the driver assistance system comprises a memory configured to store a spreading strategy "uniform crop spreading";
   wherein the memory is further configured to store the following partial strategies assigned to the spreading strategy "uniform crop spreading": a first partial strategy; a second partial strategy; a third partial strategy; a fourth partial strategy; a fifth partial strategy; a sixth partial strategy; a seventh partial strategy; and an eighth partial strategy;
   wherein the driver assistance system is configured to use the first partial strategy by: measuring a mass of a proportional crop flow exiting the spreading device and an area percentage of a ground upon which a sensed portion of the crop flow is spread; and determining, based on the mass of the proportional crop flow exiting the spreading device and the area percentage, crop distribution on the area percentage of the ground;
   wherein the driver assistance system is configured to use the second partial strategy by: determining, depending on travel speed of the combine harvester and partial width load of a grain header assigned to the combine harvester, a processed area percentage; and limiting the spreading of the exiting crop flow to the processed area percentage of the ground;

wherein the driver assistance system is configured to use the third partial strategy by: determining crop throughput and its transverse spreading in the combine harvester; and changing one or both of discharge direction or speed of the crop flow from the spreading device of the combine harvester depending on the determined throughput and the determined transverse spreading;

wherein the driver assistance system is configured to use the fourth partial strategy by: detecting travel speed relative to throughput-dependent travel speed change; and changing one or both of a discharge direction or speed of the crop flow depending on the travel speed change;

wherein the driver assistance system is configured to use the fifth partial strategy by: detecting wind parameters of wind strength, wind speed, wind direction; and changing one or both of discharge direction or speed of the crop flow depending on the detected wind parameters;

wherein the driver assistance system is configured to use the sixth partial strategy by: detecting slope gradient; and changing one or both of discharge direction or speed of the crop flow depending on the detected slope gradient;

wherein the driver assistance system is configured to use the seventh partial strategy by: detecting straw moisture; and changing one or both of discharge direction or speed of the crop flow depending on the detected straw moisture; and wherein the driver assistance system is configured to use the eighth partial strategy by: detecting decreasing crop throughput; and enlarging spreading width of the spreading device in response to detecting decreasing crop throughput.

8. The combine harvester of claim 1, wherein the driver assistance system comprises a memory configured to store a spreading strategy "chop quality"; and
   wherein the memory is further configured to store the following partial strategies assigned to the spreading strategy "chop quality":
   a stepped swiveling in of counter blades; or
   swiveling in of a rub bar.

9. The combine harvester of claim 1, wherein the driver assistance system comprises a memory configured to store a spreading strategy "energy efficiency"; and
   wherein the memory is further configured to store one or more of the following partial strategies assigned to the spreading strategy "energy efficiency": a first partial strategy; a second partial strategy; a third partial strategy; and a fourth partial strategy;
   wherein the driver assistance system is configured to use the first partial strategy by: performing one or both of a stepped swiveling out of counter blades or a swiveling out of a rub bar in order to reduce energy requirements;
   wherein the driver assistance system is configured to use the second partial strategy by: determining decomposition suitability of the crop flow to be spread on a ground; and setting a required chop length in a shredding device depending on the determined decomposition suitability;
   wherein the driver assistance system is configured to use the third partial strategy by: detecting straw moisture;

and changing chop length depending on the detected straw moisture such that with decreasing straw moisture a greater chop length is set; and wherein the driver assistance system is configured to use the fourth partial strategy by: setting the chop length longer in order to improve the decomposition suitability.

10. The combine harvester of claim 1, wherein the driver assistance system comprises a memory configured to store a spreading strategy "energy efficiency"; and wherein the memory is further configured to store the following partial strategies assigned to the spreading strategy "energy efficiency": a first partial strategy; a second partial strategy; a third partial strategy; and a fourth partial strategy;

wherein the driver assistance system is configured to use the first partial strategy by: performing one or both of a stepped swiveling out of counter blades or a swiveling out of a rub bar in order to reduce energy requirements;

wherein the driver assistance system is configured to use the second partial strategy by: determining decomposition suitability of the crop flow to be spread on a ground; and setting a required chop length in a shredding device depending on the determined decomposition suitability;

wherein the driver assistance system is configured to use the third partial strategy by: detecting straw moisture; and changing chop length depending on the detected straw moisture such that with decreasing straw moisture a greater chop length is set; and wherein the driver assistance system is configured to use the fourth partial strategy by: setting the chop length longer in order to improve the decomposition suitability.

11. The combine harvester of claim 1, wherein the driver assistance system comprises a memory configured to store a spreading strategy "energy efficiency"; and wherein, in a case of indirect detection of results of the spreading strategy "energy efficiency", the driver assistance system is configured to consider one or more of the following: speed of a shredding device; speed of a main drive; crop throughput; material properties; and transverse and longitudinal distribution in a straw chopper, rub bar, counter blade and shear bar parameters.

12. The combine harvester of claim 1, wherein the driver assistance system comprises a memory configured to store a spreading strategy "energy efficiency"; and wherein, in a case of indirect detection of results of the spreading strategy "energy efficiency", the driver assistance system is configured to consider each of the following: speed of a shredding device; speed of a main drive; crop throughput; material properties; and transverse and longitudinal distribution in a straw chopper, rub bar, counter blade and shear bar parameters.

13. The combine harvester of claim 1, wherein the computing unit is configured to store in characteristic curve fields the one or more of the partial strategies that cause regulation of spreading of the crop flow exiting the combine harvester.

14. The combine harvester of claim 1, wherein the combine harvester further comprises a spreading device in communication with the computing unit;

wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: measure a mass of a proportional crop flow exiting the spreading device and an area percentage of a ground upon which a sensed portion of the crop flow is spread; and determine, based on the mass of the proportional crop flow exiting the spreading device and the area percentage, crop distribution on the area percentage of the ground.

15. The combine harvester of claim 1, wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: determine, depending on travel speed of the combine harvester and partial width load of a grain header assigned to the combine harvester, a processed area percentage; and limit the spreading of the exiting crop flow to the processed area percentage of the ground.

16. The combine harvester of claim 1, wherein the combine harvester further comprises a spreading device in communication with the computing unit; and wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: determine crop throughput and its transverse spreading in the combine harvester; and change one or both of discharge direction or speed of the crop flow from the spreading device of the combine harvester depending on the determined throughput and the determined transverse spreading.

17. The combine harvester of claim 1, wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: detect travel speed relative to throughput-dependent travel speed change; and change one or both of a discharge direction or speed of the crop flow depending on the travel speed change.

18. The combine harvester of claim 1, wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: detect wind parameters of wind strength, wind speed, wind direction; and change one or both of discharge direction or speed of the crop flow depending on the detected wind parameters.

19. The combine harvester of claim 1, wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: detect slope gradient; and change one or both of discharge direction or speed of the crop flow depending on the detected slope gradient.

20. The combine harvester of claim 1, wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: detect straw moisture; and change one or both of discharge direction or speed of the crop flow depending on the detected straw moisture.

21. The combine harvester of claim 1 wherein the driver assistance system comprises a memory configured to store a spreading strategy "uniform crop spreading";

wherein the memory is further configured to store a specific partial strategy assigned to the spreading strategy "uniform crop spreading"; and wherein the driver assistance system is configured to use the specific partial strategy to: detect decreasing crop throughput; and enlarge spreading width of the spreading device in response to detecting decreasing crop throughput.

* * * * *